May 23, 1967  N. H. LOVENDAHL  3,320,654
TOOL HOLDER ARRANGEMENT
Filed Feb. 8, 1965
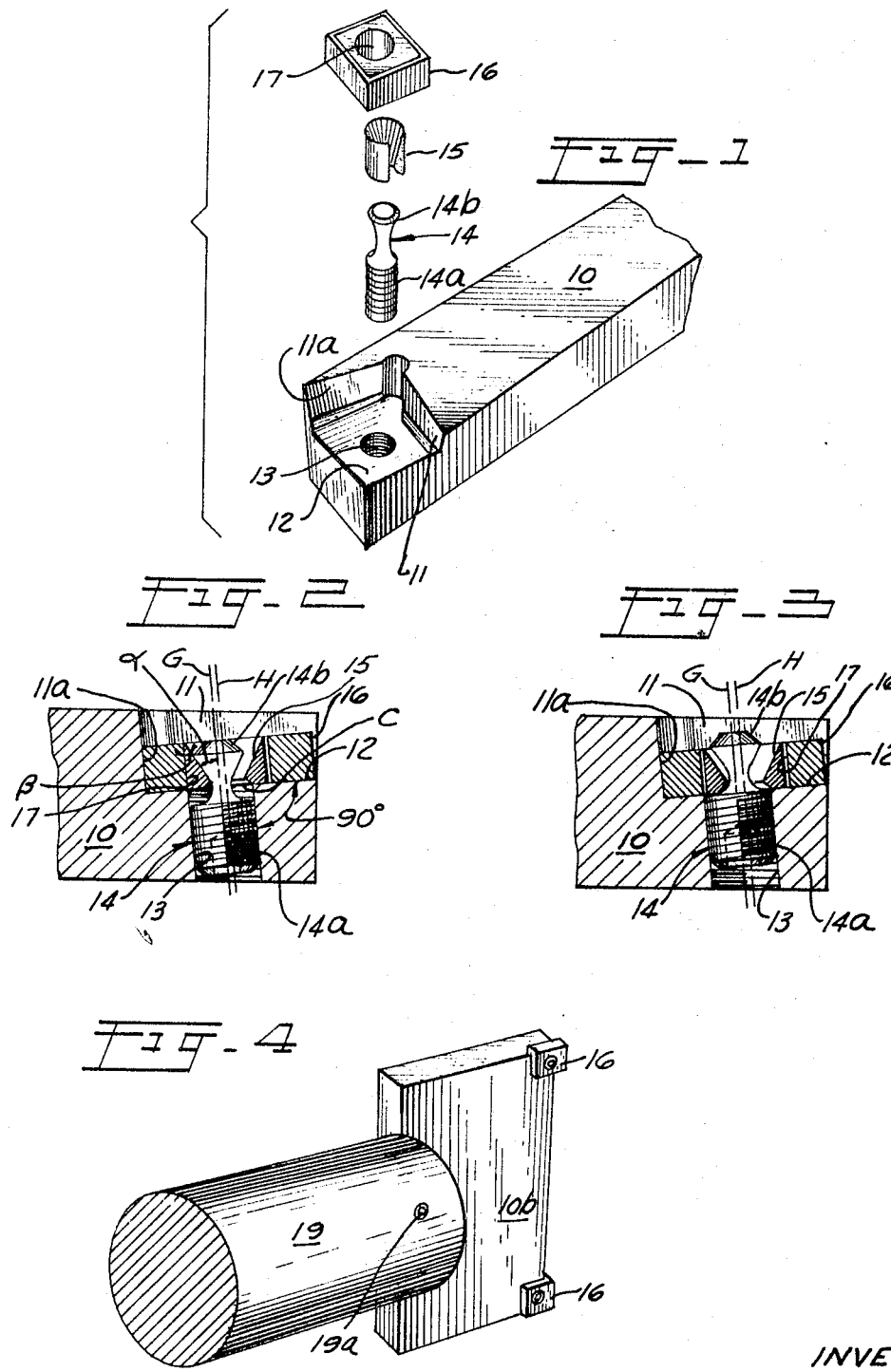
INVENTOR
N. H. LOVENDAHL
BY Phillip A. Weiss
ATTORNEY з,320,654
TOOL HOLDER ARRANGEMENT
Norman H. Lovendahl, Elmwood Park, Ill., assignor to Futurmill, Inc., Farmington, Mich., a corporation of Michigan
Filed Feb. 8, 1965, Ser. No. 430,875
11 Claims. (Cl. 29—96)

This invention relates generally to tool holders for use with machine tools and more particularly concerns a novel tool holder arrangement incorporating novel means for securing the cutting inserts in such tool holders.

In the early days of the machine tool industry cutting inserts were not employed; instead, an entire shank was made up of a tool cutting material. This was, of course, expensive, not only because of the high cost of the tool but also because of the brittleness of the tool and the necessity of using different shanks for different jobs.

To overcome these difficulties, the use of a separate tool bit or insert on a shank was soon instituted. One of the original ways used to attach the insert to the holder was by welding. This method also had obvious disadvantages. For example, as the cost of skilled labor increased the welding operation became increasingly less economical. In addition, welding the cutting insert to the tool holder provided a permanent attachment and consequently failed to realize the versatility which might be obtainable when using a separate cutting insert with a tool holding clamp.

To provide the desired versatility, screw clamp arrangements were utilized to secure the cutting insert to the tool holder. The clamping arrangements proved to be notable improvements over the previous tools and tool holding arrangements practiced by the machine tool industry. Nonetheless, difficulties were still encountered. For example, it was soon found that protruding clamps interfere with the chip flow with consequent nocuous effects on the finished machined product. In addition, it was found that chips and particularly the cutting fluid on the chips corrode the clamping device, and particularly the screw of the clamp making it almost impossible to readily remove the cutting insert.

The removal of interferences with the chip flow was affected by discarding the clamping arrangements and using instead a clamp screw arrangement whereby the cutting insert is countersunk to receive a flat head clamp screw so that nothing interferes with the chip flow. Difficulties have been encountered with this arrangement. For example, it was discovered that the corrosion problem wherein the chips corrode the clamp screw was still encountered. In addition, with the simple clamp screw arrangement the screw must be removed entirely whenever the cutting insert is removed.

Another well known cutting insert securing arrangement presently in use comprises an eccentric cam lock. With this arrangement, the problem of the locking device interfering with the chip flow is avoided as is the corrosion problem. However, other problems are encountered when using the cam-lock arrangement. For example, this arrangement inherently only makes use of one locating surface when the cutting insert is fastened to abut against the tool holder. In addition, the location and the size of the aperture in the cutting insert is critical. Also, the cut-away in the tool holder weakens the tool holder.

In addition to the tool holders mentioned, complicated combinations of the tool holders described have been tried. None of these known tool holders provides a means of overcoming all of the difficulties mentioned.

Accordingly, it is the principal object of this invention to provide an inexpensive simple tool holder that avoids the difficulties regularly encountered by known tool holders.

It is a more specific object of this invention to provide a tool holder that utilizes a screw clamp arrangement whereby nothing interferes with the chip flow.

A related object of the invention is to provide a tool holder wherein the clamp screw is not adversely affected by the corrosive nature of the machine chips.

A further object of the invention is to provide a tool holder arrangement wherein the cutting insert can be easily removed and replaced. This characteristic advantage of the inventive arrangement is accomplished since it is not necessary to remove the clamp screw to remove the cutting insert. It is only necessary to loosen the clamp screw and the cutting insert can easily be removed. Nonetheless, when the clamp screw is tightened, the cutting insert is positively located and rigidly clamped.

Still another object is to provide a tool holder arrangement wherein that portion of the tool holder that is under the cutting point of the insert is not weakened by any apertures or recesses required to retain the clamping screw.

Yet another object of the invention is to provide a tool holder arrangement wherein a novel and unique clamp screw simultaneously exerts horizontal and vertical forces on the cutting insert, clamping it against the insert bed surface of the cutting tool insert holder and the surface or furcated surfaces in planes perpendicular to the noted bed surface. Thus, the cutting inserts are both positioned and clamped against at least two surfaces allowing true location and more secure clamping.

In accordance with one aspect of the invention a tool holder arrangement is provided wherein a tool shank is truncated at one end to provide an insert bed surface or a locating surface having furcated abutment surfaces normal and contiguous thereto. A threaded aperture extends perpendicularly from the top of the insert bed surface to the bottom of the tool holder beneath the noted bed surface. Since the threaded hole is normal to the bed surface the hole is the same distance from the truncated end of the shank at the top of the bed surface as it is at the bottom of the tool holder. A special clamping screw threads into the aperture. The screw is cylindrical for approximately one-half its length. At that point it is machined so that it comprises a truncated cone with its smallest diameter at approximately the midpoint of the screw. The cone end may have the diameter of the original cylindrical screw at its end and be threaded so that it can readily pass through the aperture or it may be of a slightly smaller diameter and not threaded. The screw is interjected into the aperture until only the conical section is above the horizontal surface.

A special C-shaped collar or washer fits loosely around the screw between the top base portion of the truncated cone and the top of the cylindrical section of the screw. However, the height of the washer is less than the distance between the top of the cylindrical portion of the screw and the top base of the conical portion of the screw. Thus, the washer is free to move vertically, in relation to the screw, between the top of the cylindrical section and the top base portion of the conical portion of the screw. The washer's outer surface is planar while its inner surface matches and mates with the surface of the conical portion of the screw.

The cutting insert is slipped over the washer to abut the bed surface of the tool holder. As the screw is threaded deeper into the aperture the conical portion of the screw is forced against the inner washer surface, pressing it against the insert and thus clamps the insert into position abutting both the horizontal surface and the furcated vertical surfaces. Thus, a well located and firmly securing cutting tool is obtained.

The foregoing and other objects and advantages of this invention and the manner of obtaining them will become more apparent and the invention itself will be best understood by reference to the following description of embodiments of the invention taken in conjunction with the accompanying drawings, wherein:

FIG. 1 is an exploded pictorial representation of the tool holder arrangement of the invention;

FIGS. 2 and 3 are cross sectional views of a tool holder of FIG. 1 in its clamping position and non-clamping position, respectively;

FIG. 4 shows a type of tool holder adapted for reaming or boring;

In the drawings and in the description that follows, the same numerical designations are used to identify the same parts shown in different views.

FIG. 1 shows an embodiment of the inventive tool holder arrangement in exploded pictorial form. A shank or tool holder 10 is shown having one end thereof machined to provide several locating surfaces. Vertical locating surfaces 11, 11a are comprised of a furcated section perpendicular to the horizontal locating surface or bed 12. The vertical locating surface could be comprised of a non-furcated single vertical locating surface. The "horizontal" surface could be horizontal or could have positive or negative angles with respect to the actual horizontal, depending on the purpose and use of the tool.

The locating surface 12 has a threaded aperture 13 which has an axis that is perpendicular to surface 12 and extends through the tool holder.

The aperture 13 is designed to receive a clamp screw 14 that has a threaded cylindrical portion 14a and a conical portion 14b. Although not shown, the bottom of the clamp screw 14 is fashioned to receive a wrench, such as an Allen wrench, for use in tightening and loosening the clamp screw 14 when assembled into aperture 13. A C-shaped collar or washer 15 fits loosely around the clamp screw 14. The smallest inner diameter of the washer 15 is less than the largest diameter of the conical portion 14b. Thus, the washer 15 is normally trapped around the conical section 14b of the screw. It is dimentioned to be amenable to lateral movement relative to the axis of the screw 14.

A bit or cutting insert 16, having an aperture 17, sets over the noted washer with the washer in said aperture 17. The bit 16 is clamped firmly against both locating surfaces when the clamp screw is threaded into aperture 13 so that the conical section 14b presses against the inside of washer 15 which in turn exerts forces on the bit 16. It should be noted that the location of aperture 17 in insert 16 is not critical. For best results, however, the axis of aperture 17 should not coincide with the axis of aperture 13. On the other hand, when other means such as cams are used to hold the cutting bit, the location of the hole in the cutting insert is critical because if the aperture is misplaced, the insert will not fit over the cam and still abut a locating surface. In the inventive arrangement described herein, if the aperture is off center the insert still abuts the locating surface because the clamp screw merely stops at a different position in the aperture 13 when forcing the insert into juxtaposition with the locating surfaces.

The truncated conical section 14b assumes a diameter at least equal to the diameter of the cylindrical section at its top base end furthest from the noted cylindrical section. This portion of the clamp screw may also be threaded. The threads of the conical section increase the friction of clamp screw 14 against the washer 15 of cutting insert 16 thereby acting to lock the clamp screw and prevent its loosening or unscrewing responsive to vibrations present during a cutting operation.

Referring to FIG. 2 there is illustrated a cross-sectional view of the assembled inventive tool holder arrangement. Tool holder 10 has threaded aperture 13 at the end thereof. As is shown in FIG. 2, the central axis G of aperture 13 does not coincide with the axis H of aperture 17 and is normal to the horizontal locating surface 12.

As best shown in FIGS. 2 and 3 the C-shaped washer has flat, parallel outer walls and an outer diameter that is less than the diameter of aperture 17 but more than the diameter of aperture 13. Thus, when bit 16 is placed over the washer 15 the outer peripheral walls of washer 15 are parallel to the sides of aperture 17.

The walls of washer 15 are thinnest at the top and thicken toward the bottom. Thus, in cross section, the inner walls slope inwardly at an angle B to the outer wall. This slope may end in a shoulder section C.

The washer can be manufactured from a metallic alloy having the appropriate hardness and still have the elasticity to allow it to be inserted around screw 14. Alternately, other appropriate methods may be used to have the washer assembled as shown in FIGS. 2 and 3 around screw 14.

The apex angle of the sides of the conical section 14b of clamp screw 14 to the axis of the screw is shown as the angle $\alpha$. This angle is equal to the angle $\beta$, so that the sides of the conical section 14b are substantially parallel to and mesh with the inner peripheral wall of washer 15 in the assembly of cutting insert 16 onto tool holder 10.

The inventive cutting tool arrangement is assembled by first partially screwing clamp screw 14 with the collar, thereon into aperture 13 in shank 10. The truncated conical section 14b of the clamp screw 14 is permitted to remain well above the locating section 12 so that the distance between the outer walls of washer 15 and the furcated vertical section 11 is larger than the distance between the circumference of aperture 17 and the outer periphery of cutting insert 16. Thus, the cutting insert can easily be slipped over the washer 15. The clamping screw is then threaded deeper into aperture 13 using any appropriate tool, such as an Allen wrench. As the clamping screw goes further into aperture 13 the distance between the conical section 18 and locating surface 11 is decreased because of the angle of aperture 13 to the top of shank 10. As the noted distance decreases the conical section 18 asserts a force on the washer 15. Because of the angle of aperture 13 and the shape of the clamping screw 14, the shape and fit of the inner periphery of washer 15, this force has horizontal and vertical components. The horizontal component of the force causes the washer to push against cutting insert 16 causing it to abut vertical locating surfaces 11. Simultaneously, the vertical components of the force causes washer to move toward surface 12 and frictionally forces the cutting insert to abut against locating surface 12. Thus, the inventive arrangement causes the cutting insert to position in juxtaposition with both horizontal and vertical locating surfaces.

As illustrated in FIG. 2 when the cutting insert is clamped in place there is nothing to interfere with the chips flowing from the article undergoing machining. In addition, since the aperture 13 is slanted away from the cutting edge and adverse weakening effect of the aperture on the tool holder is minimized.

FIG. 3 shows the screw 14 in the open position wherein the cutting insert 16 is able to slip over the screw and washer assembly. Once again, FIG. 3 demonstrates the lack of coincidence of the central axis of aperture 13 and 17. This difference permits wider tolerances in the insert dimensions than were permissible in former tool holding arrangements. The washer 15 "floats" around the conical section of the screw and the insert 16 "floats" around the washer 15. That is, all of the forenamed components are loose fitting with relation to each other. As the screw is threaded into aperture 13 the conical section 14b presses against the inner angle periphery of washer 15 forcing washer 15 to move laterally with respect to surface 12 and simultaneously laterally relative to surfaces 11. The washer in turn transmits these forced motions to insert 16 by pressing against the walls of aperture 17. The fluctuation of the components assures that the insert abuts and locks against the surfaces 11 and 12 without being detrimentally askew.

In addition, it should be noted that the angle of the conical section 14b of screw 14 cooperatively abutting a similar inverse angle on the inner periphery of the washer 15 causes the insert 16 to move approximately twice as far per turn of screw 14 as the washer 15 would move if only the conical section 14b abutted the inside of aperture 17. Thus, few turns are necessary to tighten the bit 16 against the locating surfaces.

A related advantage in the inventive arrangement is that even though the screw 14 makes a minimum of contact with sleeve 15, the insert 16 is positively held juxtaposed to the locating surfaces 11 and 12. This advantage occurs because of the force amplifying effect of the washer 15 and the manner in which one outer arc of the arc is held in contact with the wall of aperture 17 even under the pressure caused by the said minimum contact of screw 14.

Other advantages inure to the inventive arrangement. For example, the insert will not fall out even if the clamp screw does loosen slightly during a machining operation, since several turns of the clamp screw are required before the insert can be removed.

Also, it should be observed that the insert is easily removed from the tool holder even when the tool holder is mounted on a machine tool. In addition, any errosion caused by the chip flow will have little if any, effect on the ability to loosen the clamp screw because, among other things, the point of screw actuation is under the tool holder out of the chip flow path.

The ease of removing inserts as well as the adaptability of the inventive arrangement to many different types of inserts makes the arrangements ideal for these different inserts, one of which is illustrated in FIG. 4. FIG. 4, for example, illustrates in a pictorial view of the use of the inventive tool holder arrangement in an embodiment substantially similar to that of FIGS. 1 and 2 but wherein the tool is used for reaming operations. The two insert tool holder 10b is held by shaft 19 by means such as set screw 19a. This showing of the tool holder arrangement is to illustrate its versatility.

One actual embodiment of the inventive arrangement has an angle $\alpha$ equal to approximately 15 degrees on a one inch square tool holder. The angle $\beta$ is also approximately 15 degrees. The insert size is one and one-half inch square and 3/16 inch thick. The inventive arrangement allows for a variation in dimensions well beyond those normally required in the industry for such clamping arrangements. Larger angles may be used for larger inserts where greater variations may be encountered.

Summarizing, the description of this invention discloses an improved, economical and reliable tool holder arrangement wherein the cutting insert is firmly clamped against at least two locating surfaces without having any impediment in the chip flow path. In addition, the location of the aperture in the insert is not critical nor is the size of the insert critical. This relaxation of critical requirements along with the ease of replacing inserts on the tool holder, because, among the other reasons, it is not necessary to remove the clamp screw to remove the cutting insert, contribute to making the inventive arrangement extremely versatile.

While the above principles and advantages of the invention have been described in connection with specific arrangements and apparatus, it is to be clearly understood that this description is made only by way of example and not as a limitation on the scope of the invention.

I claim:

1. A device for holding and automatically positioning a tool element having an aperture therein, comprising holding means having shoulder means thereon and having a threaded aperture therein whose axis is parallel to the axis of the said aperture of said tool element when said tool element is positioned on said holding means, screw means extending into said tool element aperture and threaded into the said threaded aperture, washer means at least partially surrounding said screw means in said tool element aperture, and said washer means having an outer peripheral wall shaped to exert a force within the confines of said tool element aperture urging said tool element into abutting relation with said shoulder means when said screw is threaded into said threaded aperture.

2. A device for holding and automatically positioning a tool element having an aperture therein, comprising holding means having shoulder means defining a bed thereon and having a threaded aperture therein whose axis is parallel to the axis of the tool element aperture when said tool element is positioned on said holding means, screw means having a threaded cylindrical section fitting into said threaded aperture and a truncated conical section, relilient C-shaped washer means loosely fitted over and locked onto said truncated conical section, said assembled washer means and conical section fitting loosely into said tool element aperture, said washer means having an outer wall shaped to conform substantially to the configuration of the inner wall of said tool element aperture and an inner wall forming an inverted truncated cone shaped to mesh with said truncated conical section whereby said washer means abuts the inner wall of said tool element aperture urging said tool element into contiguous abutting relation with said holding means including said shoulder means responsive to the threading of said screw means into said threaded aperture.

3. A cutting tool holder arrangement, the combination comprising removable cutting insert means having an aperture therethrough, the axis of said aperture being a certain distance from the edge of said insert means, tool holder means having a bed on at least one end thereof for receiving said cutting insert means, said bed terminating in abutment means, a threaded aperture extending from the top surface of said bed to the bottom surface thereof, said threaded aperture having an axis normal to said top surface, said axis being at a fixed distance from said abutment means, said certain distance being larger than said fixed distance, clamp screw assembly means for positoning said cutting insert means on said bed abutting said abutment means, said assembly comprising clamp screw means fitting into said threaded aperture, and resilient C-shaped washer means in said cutting insert means aperture and being translatable laterally of said axis of said threaded aperture in response to threading said screw means into said threaded aperture to cause said cutting insert means to move into contiguous relationship with said bed and abutment means.

4. The cutting tool holder arrangement of claim 3 wherein said clamp screw means is accessible from the bottom of said tool holder means.

5. The cutting tool holder arrangement of claim 3 wherein the axis of said threaded aperture is parallel to said cutting insert means aperture when said insert means is positioned on said holder means, and wherein said edge of said insert means is parallel to said abutment means and said abutment means is normal to said bed.

6. The cutting surface of claim 3 wherein said screw means comprises a threaded cylindrical section fitting said threaded aperture and a truncated conical section, and wherein said washer means has an outer wall shaped to conform substantially to the configuration of the inner wall of said insert means aperture and an inner wall forming an inverted truncated cone shaped to cooperate with said truncated conical section of said screw means to translate said washer laterally of said axis of said threaded aperture as said screw means is threaded into said threaded aperture.

7. A device for holding and positioning a cutting tool element having an aperture therein, comprising holding means including shoulder means thereon and an aperture therein, fastener means extending into said tool element aperture and being movable into and securable within said aperture of said holding means, and washer means in said tool element aperture and at least partially surrounding said fastener means, said washer means having an outer wall shaped to exert a force within said tool element aperture urging said tool element into abutting relation with said shoulder means when said fastener means is moved into and secured within said aperture of said holding means.

8. The device as defined in claim 7 wherein the respective axes of said apertures are substantially parallel when said tool element is positioned on said holding means.

9. A device for holding and positioning a cutting tool element having an aperture therein, comprising holding means including shoulder means defining a bed thereon and having an aperture therein, fastener means having a section insertable into and securable within said aperture of said holding means and a conical section, and washer means at least partially surrounding said conical section, said washer means and conical section extending into said tool element aperture, said washer means having an outer wall shaped to conform substantially to the configuration of the inner wall of said tool element aperture and an inner wall forming a cone shaped to cooperate with said conical section of said fastener means to urge said tool element into contiguous abutting relation with said holding means including said shoulder means responsive to insertion of said fastener means into said aperture of said holding means.

10. The device as defined in claim 9 wherein the respective axes of said apertures are substantially parallel when said tool element is positioned in abutting relation with said holding means.

11. The device as defined in claim 10 wherein said axes of said apertures are respectively substantially perpendicular to said bed.

References Cited by the Examiner
FOREIGN PATENTS
831,224  3/1960  Great Britain.

WILLIAM W. DYER, Jr., *Primary Examiner.*

HARRISON L. HINSON, *Examiner.*